United States Patent [19]
Bellegarda

[11] Patent Number: 6,154,722
[45] Date of Patent: Nov. 28, 2000

[54] METHOD AND APPARATUS FOR A SPEECH RECOGNITION SYSTEM LANGUAGE MODEL THAT INTEGRATES A FINITE STATE GRAMMAR PROBABILITY AND AN N-GRAM PROBABILITY

[75] Inventor: Jerome R. Bellegarda, Los Gatos, Calif.

[73] Assignee: Apple Computer, Inc., Cupertino, Calif.

[21] Appl. No.: 08/993,939

[22] Filed: Dec. 18, 1997

[51] Int. Cl.$^7$ .................................................. G10L 15/18
[52] U.S. Cl. ............................................ 704/257; 704/255
[58] Field of Search .................................. 704/257, 256, 704/255

[56] References Cited

U.S. PATENT DOCUMENTS

| | | | |
|---|---|---|---|
| 5,477,448 | 12/1995 | Golding et al. | 364/419.08 |
| 5,485,372 | 1/1996 | Golding et al. | 364/419.08 |
| 5,521,816 | 5/1996 | Roche et al. | 364/419.08 |
| 5,535,121 | 7/1996 | Roche et al. | 364/419.08 |
| 5,537,317 | 7/1996 | Schabes et al. | 364/419.08 |
| 5,621,859 | 4/1997 | Schwartz et al. | 704/256 |
| 5,712,957 | 1/1998 | Waibel et al. | 704/240 |
| 5,799,269 | 8/1998 | Schabes et al. | 704/9 |

Primary Examiner—Krista Zele
Assistant Examiner—Michael N. Opsasnick
Attorney, Agent, or Firm—Blakely, Sokoloff, Taylor & Zafman

[57] ABSTRACT

A method and an apparatus for a speech recognition system that uses a language model based on an integrated finite state grammar probability and an n-gram probability are provided. According to one aspect of the invention, speech signals are received into a processor of a speech recognition system. The speech signals are processed using a speech recognition system hosting a language model. The language model is produced by integrating a finite state grammar probability and an n-gram probability. In the integration, the n-gram probability is modified based on information provided by the finite state grammar probability; thus, the finite state grammar probability is subordinate to the n-gram probability. The language model is used by a decoder along with at least one acoustic model to perform a hypothesis search on an acoustic sequence to provide a word sequence output. The word sequence generated is representative of the received speech signals.

13 Claims, 6 Drawing Sheets

| LANGUAGE MODEL | WORD ERROR RATE |
| --- | --- |
| STANDARD BIGRAM | 18.3% |
| PERFECTLY MATCHED FINITE STATE GRAMMAR | 2.0% |
| LARGELY MISMATCHED FINITE STATE GRAMMAR | 78.4% |
| AVERAGE FINITE STATE GRAMMAR | 40.2% |
| INTEGRATED STANDARD BIGRAM AND PERFECTLY MATCHED FINITE STATE GRAMMAR | 14.0% |
| INTEGRATED STANDARD BIGRAM AND LARGELY MISMATCHED FINITE STATE GRAMMAR | 17.2% |
| AVERAGE INTEGRATED MODEL | 15.6% |

FIG. 6

METHOD AND APPARATUS FOR A SPEECH RECOGNITION SYSTEM LANGUAGE MODEL THAT INTEGRATES A FINITE STATE GRAMMAR PROBABILITY AND AN N-GRAM PROBABILITY

FIELD OF THE INVENTION

This invention relates to speech or voice recognition systems. More particularly, this invention relates to a speech recognition system using a language model that integrates a finite state grammar paradigm and an n-gram paradigm.

BACKGROUND OF THE INVENTION

The broad goal of speech recognition technology is to create devices that can receive spoken information and act appropriately upon that information. In order to maximize benefit and universal applicability, speech recognition systems (SRSs) should be capable of recognizing continuous speech, and should be able to recognize multiple speakers with possibly diverse accents, speaking styles, and different vocabularies and grammatical tendencies. Effective SRSs should also be able to recognize poorly articulated speech, and should have the ability to recognize speech in noisy environments.

Models of sub-word sized speech units form the backbone of virtually all SRSs. Many systems use phonemes to define the dictionary, but some SRSs use allophones. A phoneme is the basic theoretical unit for describing how speech conveys linguistic meaning. As such, the phonemes of a language comprise a minimal theoretical set of units that are sufficient to convey all meaning in the language; this is to be compared with the actual sounds that are produced in speaking, which speech scientists call allophones. Each phoneme can be considered to be a code that consists of a unique set of articulatory gestures. Once a speaker has formed a thought to be communicated to a listener, they construct a phrase or sentence by choosing from a collection of phonemes, or finite mutually exclusive sounds. If speakers could exactly and consistently produce these phoneme sounds, speech would amount to a stream of discrete codes. However, because of many different factors including, for example, accents, gender, and coarticulatory effects, every phoneme has a variety of acoustic manifestations in the course of flowing speech. Thus, from an acoustical point of view, the phoneme actually represents a class of sounds that convey the same meaning.

The problem involved in speech recognition is enabling the speech recognition system with the appropriate language constraints. Whether phones, phonemes, syllables, or words are viewed as the basic unit of speech, language, or linguistic, constraints are generally concerned with how these fundamental units may be concatenated, in what order, in what context, and with what intended meaning. For example, if a speaker is asked to voice a phoneme in isolation, the phoneme will be clearly identifiable in the acoustic waveform. However, when spoken in context, phoneme boundaries become difficult to label because of the physical properties of the speech articulators. Since the vocal tract articulators consist of human tissue, their positioning from one phoneme to the next is executed by movement of muscles that control articulator movement. As such, there is a period of transition between phonemes that can modify the manner in which a phoneme is produced. Therefore, associated with each phoneme is a collection of allophones, or variations on phones, that represent acoustic variations of the basic phoneme unit. Allophones represent the permissible freedom allowed within a particular language in producing a phoneme, and this flexibility is dependent on the phoneme as well as on the phoneme position within an utterance.

The typical modern speech recognition systems operate under the principle that, in some form or another, they maximize the a posteriori probability of some sequence of words W given some acoustic evidence A, where the probability is denoted $Pr(W/A)$. Using Bayes' rule, this amounts to maximizing $Pr(A/W) \times Pr(W)$, where $Pr(A/W)$ is provided by a specified acoustic model and $Pr(W)$ is provided by a specified language model. It should be noted that this formulation can be extended to other fields, such as handwriting recognition, by changing $Pr(W/A)$ appropriately; the language model component need not change since it characterizes the language itself. Therefore, language modeling plays a central role in the recognition process, where it is typically used to constrain the acoustic analysis, guide the search through various partial text hypotheses, and contribute to the determination of the final transcription.

Two statistically-based paradigms have traditionally been exploited as language models to derive the probability $Pr(W)$. The first one, the finite state grammar paradigm, relies on rule-based grammars, while the second one, the n-grammar paradigm, involves data-driven n-grams. The finite state grammar paradigm may be based on parsing or other structural a priori knowledge of the application domain, while the n-gram paradigm translates the probability of occurrence in the language of all possible strings of n words. Consequently, the finite state grammar paradigms are typically used for well-defined, small vocabulary applications such as command and control recognition, while the n-gram paradigms are typically applied to general large vocabulary dictation within some typically broad domain.

The reason for this dichotomy is well understood. In command and control applications, the number of words used for system command and control is typically limited as are the scope and complexity of the formulations. Therefore, it is straightforward to build a finite state grammar-based model to constrain the domain accordingly. In contrast, in a dictation application, potentially anything could be uttered having an arbitrary degree of complexity making reliance on a finite state grammar-based model impractical. It makes sense in the case of a dictation application to exploit the statistical patterns of the language as a knowledge source, assuming a sufficient amount of training text, or data, is available.

While the command and control and the dictation applications cover extreme ends of the speech recognition spectrum, there is an important intermediate case of a large vocabulary interaction, in which the scope and complexity of the utterances are greater than in traditional command and control, while still more constrained, for example, by a dialog model, than in traditional dictation. This situation is likely to become pervasive in future SRS user interfaces because, as the size of the vocabulary increases, finite state grammar-based models become less and less effective. There are several reasons for the decreasing effectiveness of the finite state grammar-based models. First, from a purely algorithmic perspective, the larger the grammar, the fewer constraints it offers, and therefore the lower the accuracy of the speech recognition system. Furthermore, from a SRS user's point of view, the more complex the formulation allowed, the more difficult it is to remember exactly which variations are in-grammar and which are not. As a result, in a typical SRS application that uses a finite state grammar-based model, accuracy degrades significantly if the number of language items is greater than approximately 100. This is an order of magnitude short of what a typical dialog system might require in the near future.

In contrast to finite state grammar-based models, n-gram-based models have been successfully constructed for vocabulary sizes up to approximately 60,000 words. They are typically estimated on large machine-readable text databases, comprising, for example, newspaper or magazine articles in a given broad domain. However, due to the finite size of such databases, numerous occurrences of n-word strings are infrequently encountered, yielding unreliable SRS model parameter values or coefficients. As a result, interest has been generated in fairly sophisticated parameter estimation and smoothing. Unfortunately, it remains extremely challenging to go beyond $n \leq 4$, with currently available databases and processing power. Thus, n-gram-based models alone are inadequate to capture large-span constraints present in dialog data, even if a suitable database could be collected, stored, and processed. Consequently, there is a need for a speech recognition system using a language model that integrates a finite state grammar paradigm and an n-gram paradigm into a statistical language modeling framework so as to provide speech recognition in the intermediate case of a large vocabulary interaction.

SUMMARY OF THE INVENTION

A method and an apparatus for a speech recognition system that uses a language model based on an integrated finite state grammar probability and an n-gram probability are provided. According to one aspect of the invention, speech signals are received into a processor of a speech recognition system. The speech signals are processed using a speech recognition system hosting a language model. The language model is produced by integrating a finite state grammar probability and an n-gram probability. In the integration, the n-gram probability is modified based on information provided by the finite state grammar probability; thus, the finite state grammar probability is subordinate to the n-gram probability. The language model is used by a decoder along with at least one acoustic model to perform a hypothesis search on an acoustic sequence to provide a word sequence output. The word sequence generated is representative of the received speech signals.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which:

FIG. 6 shows the results of the evaluation of the language model of one embodiment in terms of average word error rate across the speakers considered.

DETAILED DESCRIPTION

A method and an apparatus for a speech recognition system that uses a language model based on an integrated finite state grammar probability and an n-gram probability are provided. The method and apparatus described herein may also be used in pattern recognition systems and handwriting recognition systems. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. It is noted that experiments with the method and apparatus provided herein show significant speech recognition improvements when compared to speech recognition systems using typical prior art language models.

Figure 1:
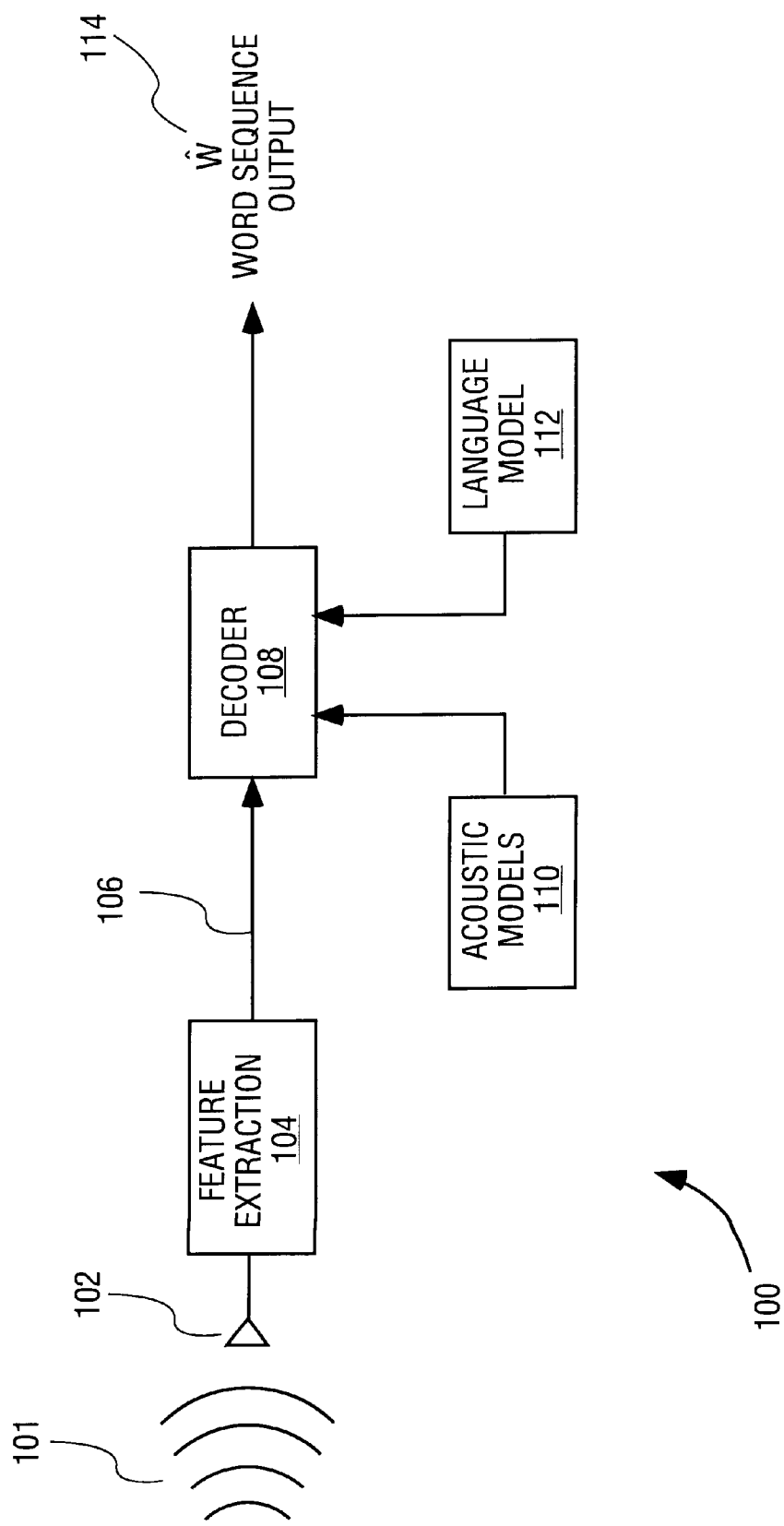
FIG. 1 is a speech recognition system of one embodiment.

FIG. 1 is a SRS 100 of one embodiment. An input device 102 is coupled to the SRS 100 and inputs a voice signal 101 into the SRS 100 by converting the voice signal 101 into an electrical signal representative of the voice signal 101. A feature extractor 104, or signal sampler, coupled to the input device 102 samples the signal at a particular frequency, the sampling frequency determined using techniques known in the art. The feature extractor 104 may perform signal segmentation by segmenting the electrical signal representative of a voice signal into phonemes or phones or words, but is not so limited. A decoder 108 is coupled to receive the output 106 of the feature extractor 104. The output 106 of the feature extractor 104 is an acoustic sequence that is a representation of speech events in the speech signal 101. The decoder 108 uses acoustic models 110 and a language model 112 to perform a hypothesis search. These models are trained in a supervised paradigm as to the statistical makeup of appropriate exemplars, or observation strings. The decoder 108 provides output signals 114 representative of the received speech signals 101.

The SRS comprising components 102–112 may be hosted on a processor, but is not so limited. For an alternate embodiment, the decoder 108 may comprise some combination of hardware and software that is hosted on a different processor from SRS components 102, 104, 110, and 112. For another alternate embodiment, a number of model devices, each comprising a different acoustic model or a language model, may be hosted on a number of different processors. Another alternate embodiment has multiple processors hosting the acoustic models and the language model. For still another embodiment, a number of different model devices may be hosted on a single processor.

Figure 2:
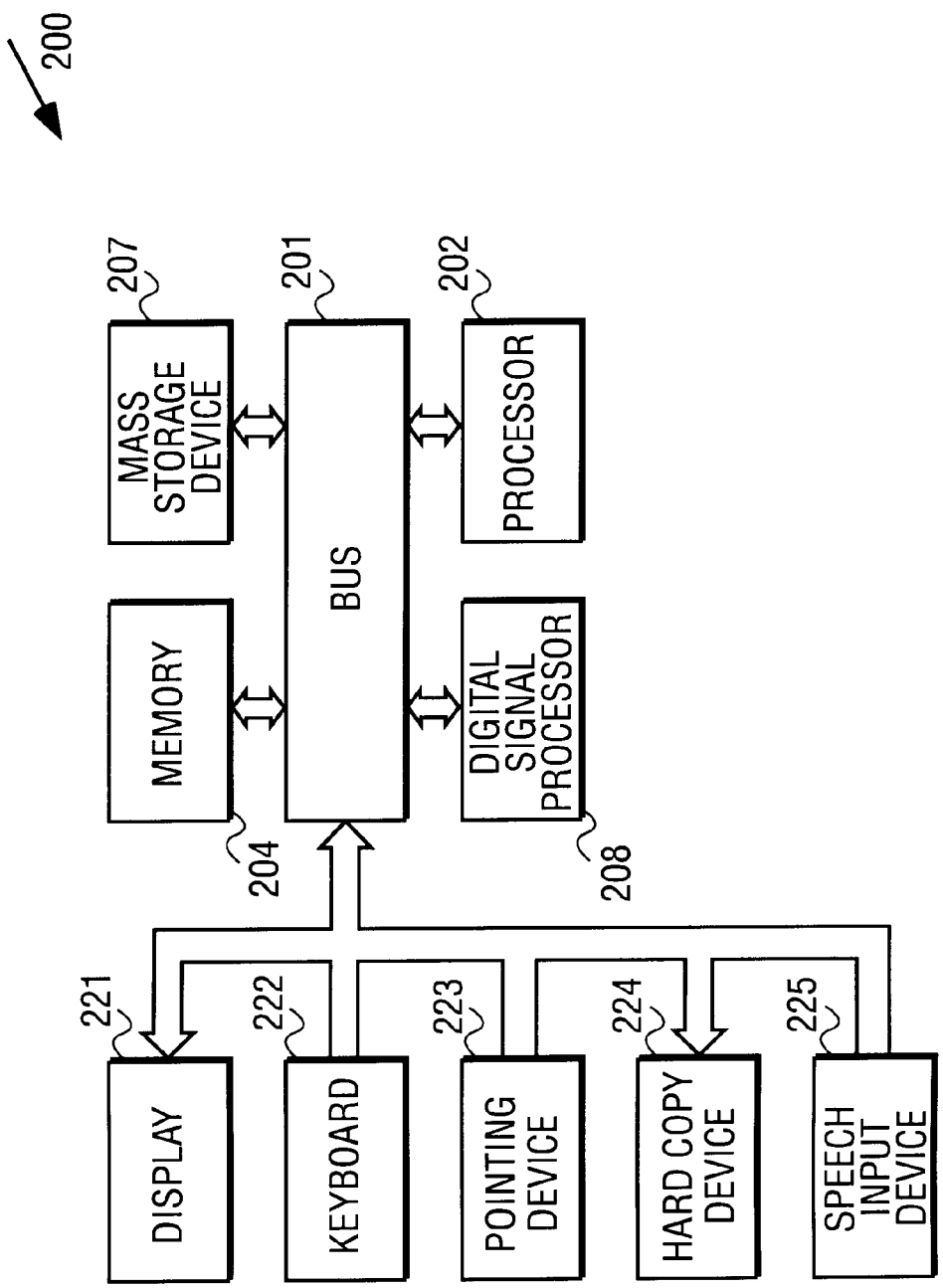
FIG. 2 is a computer system hosting the speech recognition system of one embodiment.

FIG. 2 is a computer system 200 hosting the speech recognition system (SRS) of one embodiment. The computer system 200 comprises, but is not limited to, a system bus 201 that allows for communication among a processor 202, a digital signal processor 208, a memory 204, and a mass storage device 207. The system bus 201 is also coupled to receive inputs from a keyboard 222, a pointing device 223, and a speech signal input device 225, but is not so limited. The system bus 201 provides outputs to a display device 221 and a hard copy device 224, but is not so limited.

Figure 3:
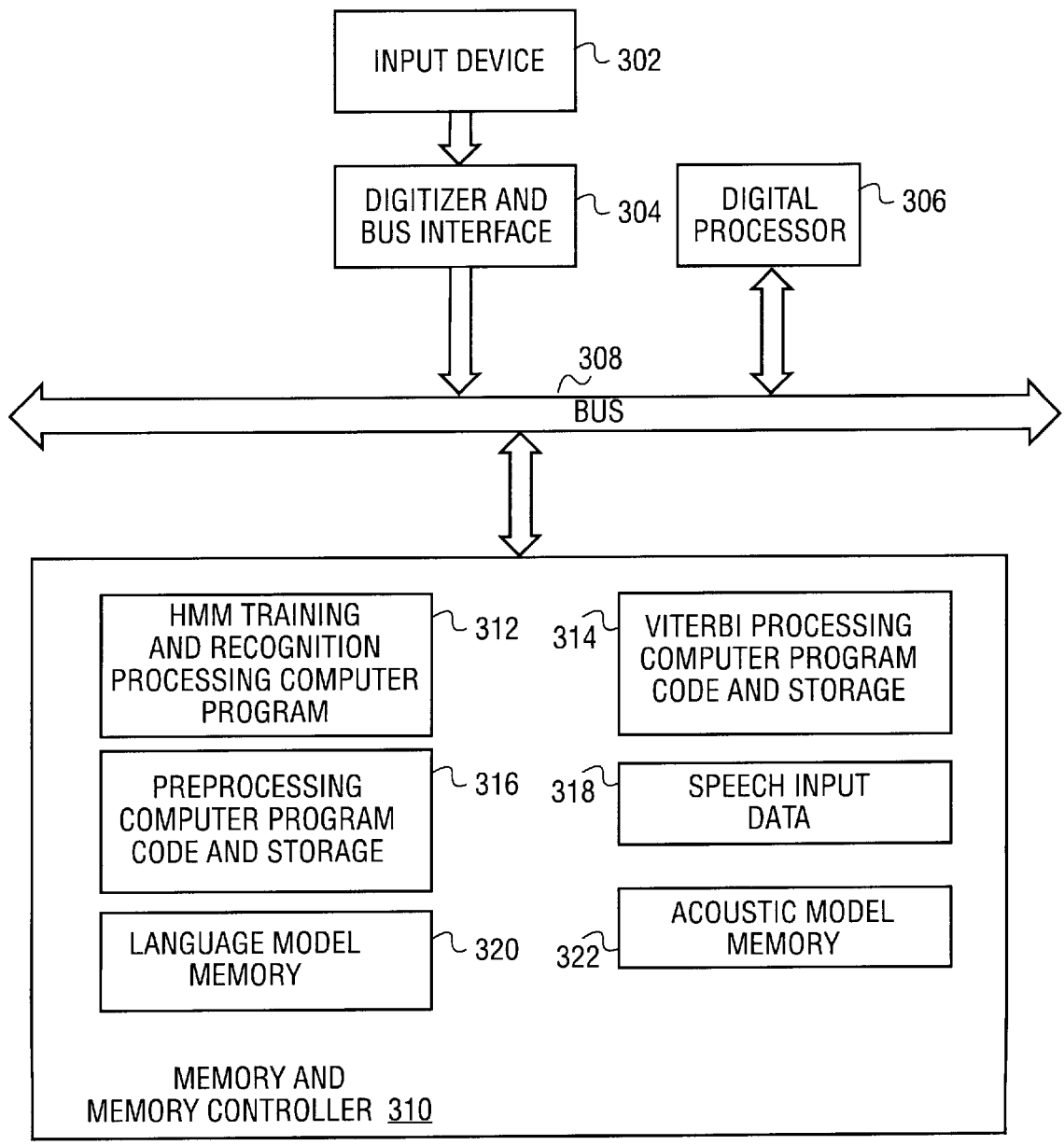
FIG. 3 is the computer system memory hosting the speech recognition system of one embodiment.

FIG. 3 is the computer system memory 310 hosting the speech recognition system of one embodiment. An input device 302 provides speech signals to a digitizer and bus interface 304. The digitizer 304, or feature extractor, samples and digitizes the speech signals for further processing. The digitizer and bus interface 304 allows for storage of the digitized speech signals in the speech input data memory component 318 of memory 310 via the system bus 308. The digitized speech signals are processed by a digital processor 306 using algorithms and data stored in the components 312–322 of the memory 310. As discussed herein, the algorithms and data that are used in processing the speech signals are stored in components of the memory 310 comprising, but not limited to, a hidden Markov model (HMM) training and recognition processing computer program 312, a viterbi processing computer program code and storage 314, a preprocessing computer program code and storage 316, language model memory 320, and acoustic model memory 322.

Figure 4:
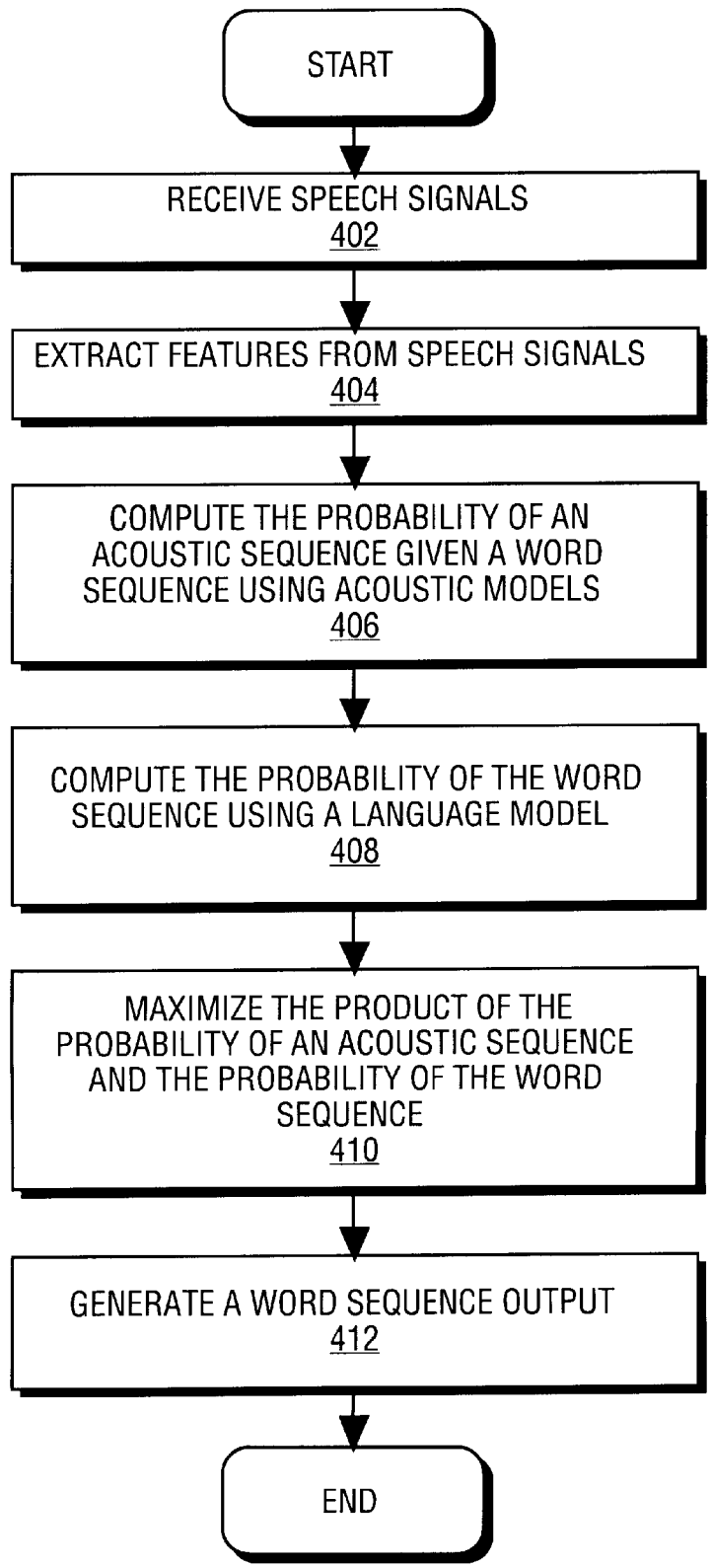
FIG. 4 is a flowchart for the speech recognition system of one embodiment.

FIG. 4 is a flowchart for the speech recognition system of one embodiment. Operation begins at step 402, at which speech signals are received into a processor. The features of the signal required for speech recognition processing are extracted from the received speech signals, at step 404. In decoding the received speech signals, acoustic models are used, at step 406, to compute the probability of an acoustic sequence given a particular word sequence.

Typically, a set of acoustic models are used because one model is used for each phoneme in the particular language, but the embodiment is not so limited. The acoustic models are typically based on a parameter sharing hidden Markov model (HMM) that is used to model the speech utterance represented in the received speech signal. An HMM is a stochastic finite state automaton, or a type of abstract machine used to model a speech utterance. The utterance modeled by an HMM of one embodiment may be, but is not limited to, a word, a subword unit like a phoneme, or a complete sentence or paragraph. Using the HMM, a speech utterance is reduced to a string of features, or observations, because these features represent the information that is "observed" from the incoming speech utterance. Therefore, an HMM which is associated with a particular phoneme or other utterance is a finite state machine capable of generating observation strings. An HMM is more likely to produce observation strings that would be observed from real utterances of its associated phoneme.

Operation of the speech recognition system continues at step 408, at which the probability of the particular word sequence is computed using a language model. In one embodiment, a single language model is used, but the embodiment is not so limited. At step 410, the product of the probability of the acoustic sequence, computed at step 406, and the probability of the particular word sequence, computed at step 408, are maximized. A word sequence output is generated at step 412, the word sequence output representative of the received speech signals.

Figure 5:
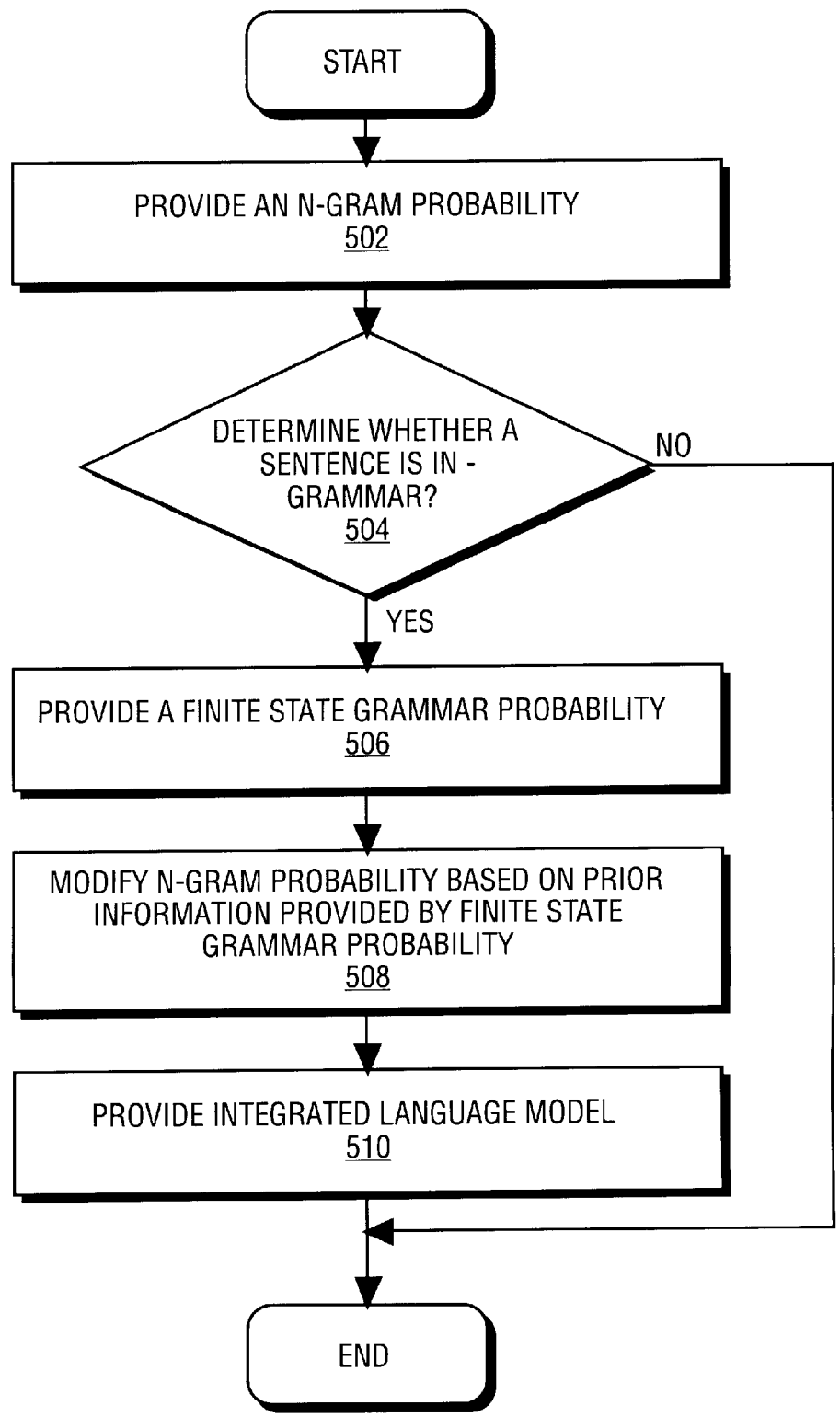
FIG. 5 is a flowchart for producing the language model of one embodiment for use by the decoder in performing a hypothesis search.

FIG. 5 is a flowchart for producing the language model of one embodiment for use by the decoder in performing a hypothesis search. Operation begins at step 502, at which an n-gram probability is provided. A determination is made, at step 504, whether a sentence is in-grammar. When the sentence is not in-grammar, operation ends and only the n-gram probability is used. In cases where the sentence is determined to be in-grammar at step 504, operation continues at step 506, at which a finite state grammar probability is provided. The n-gram probability is modified, at step 508, based on information provided by the finite state grammar probability. The integrated language model is produced, at step 510. The detailed discussion of the generation of the integrated language model is now discussed.

A potential solution to the problem of providing speech recognition in the intermediate case of a large vocabulary interaction is provided by a language model that integrates the finite grammar paradigm and the n-gram paradigm, thereby exploiting the advantages of both. Therefore, a properly targeted, or trained, finite state grammar-based model enhances accuracy, while the n-gram-based model provides some robustness to sentence variability.

Traditionally, an integration of this type used either simple interpolation or the maximum entropy formulation. Unfortunately, neither are particularly well suited to the problem because of the restrictions on size with respect to the finite state grammar and the restrictions on span with respect to the n-grams. Thus, it is more practical to consider subordinating one paradigm to the other. Because of the difficulty encountered in constructing a complete grammar in a large vocabulary context, it is most natural to subordinate the finite state grammar paradigm to the n-gram paradigm. When subordinating the finite state grammar paradigm to the n-gram paradigm, the role of the finite state grammar paradigm is to selectively complement the statistical properties of the n-gram paradigm language model by exploiting whatever structural properties the discourse domain possesses.

In generating the integrated language model of one embodiment, $W_q$ denotes the word to be predicted, assumed to belong to some underlying vocabulary V, and $H_q$ denotes the admissible history, or context, for this particular word. The role of the language model is to provide an estimate of the probability of observing the word $w_q$ given the history considered, $\Pr(w_q|H_q)$. In the n-gram probability case, this probability is specified by the equation $$\Pr(w_q|H_q)=\Pr(w_q|H_q^{(n)})=\Pr(w_q|W_{q-1}W_{q-2}\ldots W_{q-n+1}), \qquad (1)$$

where the context consists of n−1 words. In the case of the probabilistic finite state grammar, G, the relevant history comprises the present sentence up to the word $w_q$, denoted $S_q$, provided it is in-grammar. The present history is in-grammar when the present sentence $S_q$ is a subset of the probabilistic finite state grammar, or $S_q \epsilon G$. Thus, the probability sought can be expressed as:

$$\Pr(W_q|H_q)=\Pr(w_q|H_q^{(g)})=\Pr(w_q|S_q \epsilon G). \qquad (2)$$

If $S_q$ is not in-grammar, then typically $\Pr(W_q|H_q)$ will equal zero in equation 2; however, this case may be assigned a small non-zero probability $\epsilon$ and re-normalize accordingly.

Using equation 1, $\Pr(W_q|w_{q-1}w_{q-2}\ldots W_{q-n+1})$ is computed from the training corpus as a relative frequency count. Using equation 2, $\Pr(W_q|S_q \epsilon G)$ is derived according to the type of grammar considered. For example, in the case of a simple word-pair grammar, then $\Pr(w_q|S_q \epsilon G)$ reduces to $\delta(w_q w_{q-1} \epsilon G)$, where $\delta$ is the Kronecker operator. More elaborate grammars relying on parsing can lead to an arbitrarily complex expression.

To integrate the finite state grammar paradigm and the n-gram paradigm as previously described, a computation is made of $$\Pr(w_q|H_q)=\Pr(w_q|H_q^{(n)},H_q^{(g)}), \qquad (3)$$

where the history, $H_q$, now comprises an n-gram component ($H_q^{(n)}$) as well as a finite state grammar component ($H_q^{(g)}$). Using the definition of a conditional probability, applying marginal probability expansion, and re-arranging, this expression can be rewritten as $$\Pr(w_q|H_q) = \frac{(\Pr(w_q, H_q^{(n)})\Pr(H_q^{(g)}|w_q, H_q^{(n)}))}{\sum_{w_i \in V}\left(\Pr(w_i|H_q^{(n)})\Pr(H_q^{(g)}|w_i, H_q^{(n)})\right)} \quad (4)$$

where the summation in the denominator extends over all words in the underlying vocabulary, V, thereby reflecting the normalizing role of the denominator.

The first term in the numerator of equation 4 corresponds to the n-gram probability as obtained in equation 1. The second term in the numerator of equation 4 carries the influence of the finite state grammar probability, which is consistent with the subordination approach discussed previously. In essence, cast in a Bayesian framework, equation 4 translates the fact that the n-gram probability is modified based on the prior information provided by the finite state grammar probability.

The second term in the numerator of equation 4 can be further expanded as $$\Pr(H_q^{(g)}|w_q, H_q^{(n)}) = \frac{\Pr(w_q, H_q^{(n)}|H_q^{(g)})\Pr(H_q^{(g)})}{\Pr(w_q, H_q^{(n)})}, \quad (5)$$

where the factor $\Pr(H_q^{(g)})$ can be ignored since it will also appear in the denominator of equation 4. Furthermore, $\Pr(w_q, H_q^{(n)}|H_q^{(g)})$ can be simplified by noting that if $S_q \in G$, then any subsentence of $S_q$ is also in-grammar. Therefore, without loss of generality, $\Pr(w_q, H_q^{(n)}|H_q^{(g)})$ reduces to $\Pr(w_q|H_q^{(g)})$. Combining, the integrated probability of equation 4 becomes $$\Pr(w_q|H_q) = \frac{\Pr(w_q|w_{q-1}\ldots w_{q-n+1})\frac{\Pr(w_q|S_q \in G)}{\Pr(w_q w_{q-1}\ldots w_{q-n+1})}}{\sum_{w_i \in V}\Pr(w_i|w_{q-1}\ldots w_{q-n+1})\frac{\Pr(w_i|S_q \in G)}{\Pr(w_i w_{q-1}\ldots w_{q-n+1})}} \quad (6)$$

which is an integrated n-gram probability-based language model incorporating prior information from the finite state grammar probability.

An evaluation was conducted on the integrated model of one embodiment using several tests from the Advanced Research Projects Agency (ARPA) North American Business (NAB) News Corpus. For each speaker, 20,000-word speech recognition experiments were performed with an identical set of speaker-independent acoustic models, and one of five language models. The five language models used included: the standard ARPA bigram trained on 240 million words of the NAB corpus; a word-pair grammar constructed by pooling together all the test sets to simulate a "completely in-grammar" evaluation; a word-pair grammar constructed from an equivalent amount of training material to reflect a more likely "largely out-of-grammar" evaluation; the integrated bigram/grammar language model derived as described herein, using the grammar of the word-pair grammar constructed from pooling together all the test sets as the grammar component; and the integrated bigram/grammar language model derived as described herein, using the grammar of the word-pair grammar constructed from an equivalent amount of training material as the grammar component.

FIG. 6 shows the results of the evaluation of the integrated language model of one embodiment in terms of average word error rate across the models considered. Compared to the standard bigram 602, the integrated language model 614 yields a reduction in word error rate of approximately 15%. The real benefit of the integrated model is found in the comparison with the finite state grammar-based language model. If the test set is completely in-grammar 604, the finite state grammar-based model performs relatively well with a word error rate of approximately two percent. But in the more realistic case where the test set is largely out-of grammar 606, the integrated language model 614 leads to an error rate of approximately five times lower. Thus, the integrated language model described herein results in an average reduction in word error rate of over 60% compared to the finite state grammar-based model 602 alone. This shows that the integrated model leads to a substantial increase in robustness.

Thus, a method and an apparatus for a speech recognition system that uses a language model based on an integrated finite state grammar probability and an n-gram probability have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for recognizing speech comprising:

receiving speech signals into a processor;

processing the received speech signals using a language model produced by integrating a finite state grammar probability and an n-gram probability with the finite state grammar probability being subordinated to the n-gram probability, wherein the language model comprises a probability that is specified by the equation $$\Pr(w_q|H_q) = \frac{\Pr(w_q|w_{q-1}\ldots w_{q-n+1})\frac{\Pr(w_q|S_q \in G)}{\Pr(w_q w_{q-1}\ldots w_{q-n+1})}}{\sum_{w_i \in V}\Pr(w_i|w_{q-1}\ldots w_{q-n+1})\frac{\Pr(w_i|S_q \in G)}{\Pr(w_i w_{q-1}\ldots w_{q-n+1})}}$$

where, $w_q$ is the word about to be predicted, $H_q$ is the admissible history for this particular word, G is the probabilistic finite state grammar, $S_q$ is the present sentence up to $w_q$, and V is the vocabulary to which $w_q$ belongs; and generating a word sequence representative of the received speech signals.

2. The method of claim 1, wherein the language model is used with at least one acoustic model to perform a hypothesis search on an acoustic sequence to provide a word sequence output.

3. The method of claim 2, wherein the at least one acoustic model is based on a hidden Markov model paradigm, wherein the at least one acoustic model comprises one model for each of at least one phonemes.

4. An apparatus for speech recognition comprising:

an input for receiving speech signals into a processor;

a processor configured to recognize the received speech signals using a language model produced by integrating a finite state grammar paradigm and an n-gram paradigm, with the finite state grammar paradigm being subordinated to the n-gram paradigm, wherein the language model comprises a probability that is specified by the equation $$\Pr(w_q|H_q) = \frac{\Pr(w_q|w_{q-1}\ldots w_{q-n+1})\dfrac{\Pr(w_q|S_q \in G)}{\Pr(w_q w_{q-1}\ldots w_{q-n+1})}}{\sum_{w_i \in V} \Pr(w_i|w_{q-1}\ldots w_{q-n+1})\dfrac{\Pr(w_i|S_q \in G)}{\Pr(w_i w_{q-1}\ldots w_{q-n+1})}}$$

where, $w_q$ is the word about to be predicted, $H_q$ is the admissible history for this particular word, G is the probabilistic finite state grammar, $S_q$ is the present sentence up to $w_q$, and V is the vocabulary to which $w_q$ belongs; and an output for providing a word sequence representative of the received speech signals.

5. The apparatus of claim 4, wherein the processor is further configured to control a hypothesis search by a decoder, the decoder using inputs from the language model and from at least one acoustic model to execute the hypothesis search.

6. The apparatus of claim 5, wherein the at least one acoustic model is based on a hidden Markov model paradigm.

7. A speech recognition process comprising a statistical learning technique that uses a language model produced by integrating a finite state grammar probability and an n-gram probability with the finite state grammar probability being subordinated to the n-gram probability, wherein the language model comprises a probability that is specified by the equation $$\Pr(w_q|H_q) = \frac{\Pr(w_q|w_{q-1}\ldots w_{q-n+1})\dfrac{\Pr(w_q|S_q \in G)}{\Pr(w_q w_{q-1}\ldots w_{q-n+1})}}{\sum_{w_i \in V} \Pr(w_i|w_{q-1}\ldots w_{q-n+1})\dfrac{\Pr(w_i|S_q \in G)}{\Pr(w_i w_{q-1}\ldots w_{q-n+1})}}$$

where, $w_q$ is the word about to be predicted, $H_q$ is the admissible history for this particular word, G is the probabilistic finite state grammar, $S_q$ is the present sentence up to $w_q$, and V is the vocabulary to which $w_q$ belongs.

8. The process of claim 7, wherein at least one acoustic model is used, the at least one acoustic model used with the language model in executing a hypothesis search on an acoustic sequence to provide a word sequence output.

9. A computer readable medium containing executable instructions which, when executed in a processing system, causes the system to perform a method for recognizing speech comprising:

receiving a speech signal into a processor;

processing the received speech signal using a language model produced by integrating a finite state grammar probability and an n-gram probability with the finite state grammar probability being subordinated to the n-gram probability, wherein the language model comprises a probability that is specified by the equation $$\Pr(w_q|H_q) = \frac{\Pr(w_q|w_{q-1}\ldots w_{q-n+1})\dfrac{\Pr(w_q|S_q \in G)}{\Pr(w_q w_{q-1}\ldots w_{q-n+1})}}{\sum_{w_i \in V} \Pr(w_i|w_{q-1}\ldots w_{q-n+1})\dfrac{\Pr(w_i|S_q \in G)}{\Pr(w_i w_{q-1}\ldots w_{q-n+1})}}$$

where, $w_q$ is the word about to be predicted, $H_q$ is the admissible history for this particular word, G is the probabilistic finite state grammar, $S_q$ is the present sentence up to $w_q$, and V is the vocabulary to which $w_q$ belongs; and generating a word sequence representative of the received speech signal.

10. The computer readable medium of claim 9, wherein the language model is used with at least one acoustic model to perform a hypothesis search on an acoustic sequence to provide a word sequence output.

11. A method for generating a language model for use in a speech recognition system comprising:

integrating a finite state grammar probability and an n-gram probability with the finite state grammar probability being subordinated to the n-gram probability, wherein the language model comprises a probability that is specified by the equation $$\Pr(w_q|H_q) = \frac{\Pr(w_q|w_{q-1}\ldots w_{q-n+1})\dfrac{\Pr(w_q|S_q \in G)}{\Pr(w_q w_{q-1}\ldots w_{q-n+1})}}{\sum_{w_i \in V} \Pr(w_i|w_{q-1}\ldots w_{q-n+1})\dfrac{\Pr(w_i|S_q \in G)}{\Pr(w_i w_{q-1}\ldots w_{q-n+1})}}$$

where, $w_q$ is the word about to be predicted, $H_q$ is the admissible history for this particular word, G is the probabilistic finite state grammar, $S_q$ is the present sentence up to $w_q$, and V is the vocabulary to which $w_q$ belongs.

12. The method of claim 11, further comprising using the language model along with at least one acoustic model to perform a hypothesis search on an acoustic sequence to provide a word sequence output.

13. The method of claim 12, wherein the at least one acoustic model is based on a hidden Markov model paradigm, wherein the at least one acoustic model comprises one model for each of at least one phonemes.

* * * * *